(12) United States Patent
Nguyen (10) Patent No.: US 9,070,070 B2
(45) Date of Patent: Jun. 30, 2015

(54) RADIO FREQUENCY ANTENNA CARRIED ON A SMART CARD

(71) Applicant: EchoStar Technologies L.L.C., Englewood, CO (US)

(72) Inventor: Phuc H. Nguyen, Parker, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 14/066,879

(22) Filed: Oct. 30, 2013

(65) Prior Publication Data

US 2015/0115030 A1    Apr. 30, 2015

(51) Int. Cl.
*G06K 7/08*     (2006.01)
*G06K 19/06*    (2006.01)
*G06K 19/077*   (2006.01)
*G06K 7/10*     (2006.01)

(52) U.S. Cl.
CPC ...... *G06K 19/07773* (2013.01); *G06K 7/10316* (2013.01)

(58) Field of Classification Search
USPC ................... 235/439, 451, 486, 492
See application file for complete search history.

(56) References Cited

U.S. PATENT DOCUMENTS

| | | | | |
|---|---|---|---|---|
| 5,841,122 | A  * | 11/1998 | Kirchhoff | 235/492 |
| 6,840,455 | B2 * | 1/2005  | Norton    | 235/492 |
| 8,608,087 | B2 * | 12/2013 | Lee       | 235/492 |
| 2006/0091200 | A1 * | 5/2006 | Lai et al. | 235/380 |
| 2006/0196949 | A1 * | 9/2006 | Ando et al. | 235/492 |
| 2009/0044970 | A1 * | 2/2009 | Kosowsky | 174/256 |
| 2010/0012721 | A1   | 1/2010 | Jain et al. | |
| 2012/0234926 | A1 * | 9/2012 | Nozaki | 235/492 |
| 2012/0235789 | A1 * | 9/2012 | Tuda | 340/5.74 |
| 2012/0235796 | A1 * | 9/2012 | Kishimoto | 340/10.4 |
| 2013/0233929 | A1 * | 9/2013 | Kargl | 235/492 |
| 2014/0001264 | A1 * | 1/2014 | Babu et al. | 235/440 |

* cited by examiner

*Primary Examiner* — Tuyen K Vo
(74) *Attorney, Agent, or Firm* — Ingrassia Fisher & Lorenz, P.C.

(57) ABSTRACT

A smart card apparatus and related systems are presented here. The smart card apparatus includes a dielectric substrate forming a card body, a card circuit module carried by the dielectric substrate, and a radio frequency (RF) antenna arrangement carried by the dielectric substrate. The RF antenna arrangement is physically and electrically isolated from the card circuit module, and RF signals communicated by the RF antenna arrangement are unrelated to native functionality of the card circuit module.

22 Claims, 4 Drawing Sheets

RADIO FREQUENCY ANTENNA CARRIED ON A SMART CARD

TECHNICAL FIELD

Embodiments of the subject matter described herein relate generally to radio frequency (RF) devices and RF communication. More particularly, embodiments of the subject matter relate to an RF antenna structure that utilizes a smart card substrate as a dielectric carrier.

BACKGROUND

The prior art is replete with systems, devices, and components that support wireless data communication in one form or another. For example, most (if not all) portable computer-based devices (laptop computers, tablet computers, smartphones, and video game platforms) support wireless communication in accordance with the Wi-Fi communication protocol, the Bluetooth communication protocol, cellular communication protocols, and the like. Moreover, many consumer products and appliances are also being offered with native wireless data communication capabilities. For example, television equipment, DVD players, audio equipment, and video services receivers (set top boxes) may be provided with native Wi-Fi and/or Bluetooth communication features. Such wireless data communication requires data transmission in accordance with a specific data communication protocol, a radio frequency (RF) transceiver, and a suitable antenna structure configured to transmit and receive signals.

It can be challenging to design and implement an efficient antenna structure for some consumer appliances. For example, a device having an electrically conductive housing or chassis can present issues related to packaging and electromagnetic performance. Moreover, it may be difficult to deploy and position an RF antenna in compact applications where free space is limited or otherwise restricted.

Accordingly, it is desirable to have a compact, efficient, and effective RF antenna structure suitable for use with host device, such as a video services receiver, an appliance, or the like. Furthermore, other desirable features and characteristics of the present invention will become apparent from the subsequent detailed description and the appended claims, taken in conjunction with the accompanying drawings and the foregoing technical field and background.

BRIEF SUMMARY

An exemplary embodiment of an apparatus includes a smart card interface configured to receive smart cards, a radio frequency (RF) transceiver module, and a smart card compatible with the smart card interface. The smart card includes a dielectric substrate forming a card body, and an RF antenna arrangement carried by the dielectric substrate. The apparatus also includes an RF transmission line having a first end configured to connect with the RF antenna arrangement, and having a second end configured to connect with the RF transceiver module.

Another exemplary embodiment of an apparatus is provided here. The apparatus includes a smart card interface configured to read data stored on smart cards, an RF transceiver module, and a smart card physically and electrically coupled to the smart card interface. The smart card includes a dielectric substrate forming a card body, a card circuit module carried by the dielectric substrate, wherein the smart card interface reads data stored in the card circuit module, and an RF antenna arrangement carried by the dielectric substrate. The RF antenna arrangement is functionally divorced from the card circuit module. Moreover, operation of the card circuit module is unaffected by RF signals communicated by the RF antenna arrangement. The apparatus also includes an RF transmission cable having a first end physically and electrically connected to the RF antenna arrangement, and having a second end electrically coupled to the RF transceiver module.

An exemplary embodiment of a smart card apparatus is also presented here. The smart card apparatus includes a dielectric substrate forming a card body, a card circuit module carried by the dielectric substrate, and an RF antenna arrangement carried by the dielectric substrate. The RF antenna arrangement is physically and electrically isolated from the card circuit module, and RF signals communicated by the RF antenna arrangement are unrelated to native functionality of the card circuit module.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

For the sake of brevity, conventional techniques related to wireless data communication, RF antenna design, video services receivers, and other functional aspects of the systems (and the individual operating components of the systems) may not be described in detail herein. Furthermore, the figures are intended to represent exemplary functional relationships and/or physical couplings between the various elements. It should be noted that many alternative or additional functional relationships or physical connections may be present in a practical embodiment.

The embodiments and the subject matter described here relate to a unique smart card configuration that utilizes the dielectric substrate (e.g., plastic body) of the smart card as a carrier for an RF antenna. The smart card merely serves as a convenient place to locate the RF antenna, which is suitably configured to handle wireless data communication for an "off-card" RF transceiver module. Thus, although the RF antenna is physically located on the smart card, the RF signals received/transmitted by the RF antenna are not intended for use with the smart card circuitry. Instead, the RF antenna is connected to a remotely located RF transceiver module via an RF transmission line, such as a miniature coaxial cable.

The smart card presented here can be utilized in conjunction with any apparatus or piece of electronic equipment, as desired for the intended application. For example, and without limitation, the smart card may be compatible with a DVD player, a home theater receiver, a vending machine, a video game console, a mobile device, a home appliance, a television set, or a video services receiver (such as a set top box of the type used with a satellite or cable video service). Although a variety of applications are possible, the embodiment described in detail below relates to an exemplary embodiment of a video services receiver that cooperates with a smart card.

Figure 1:
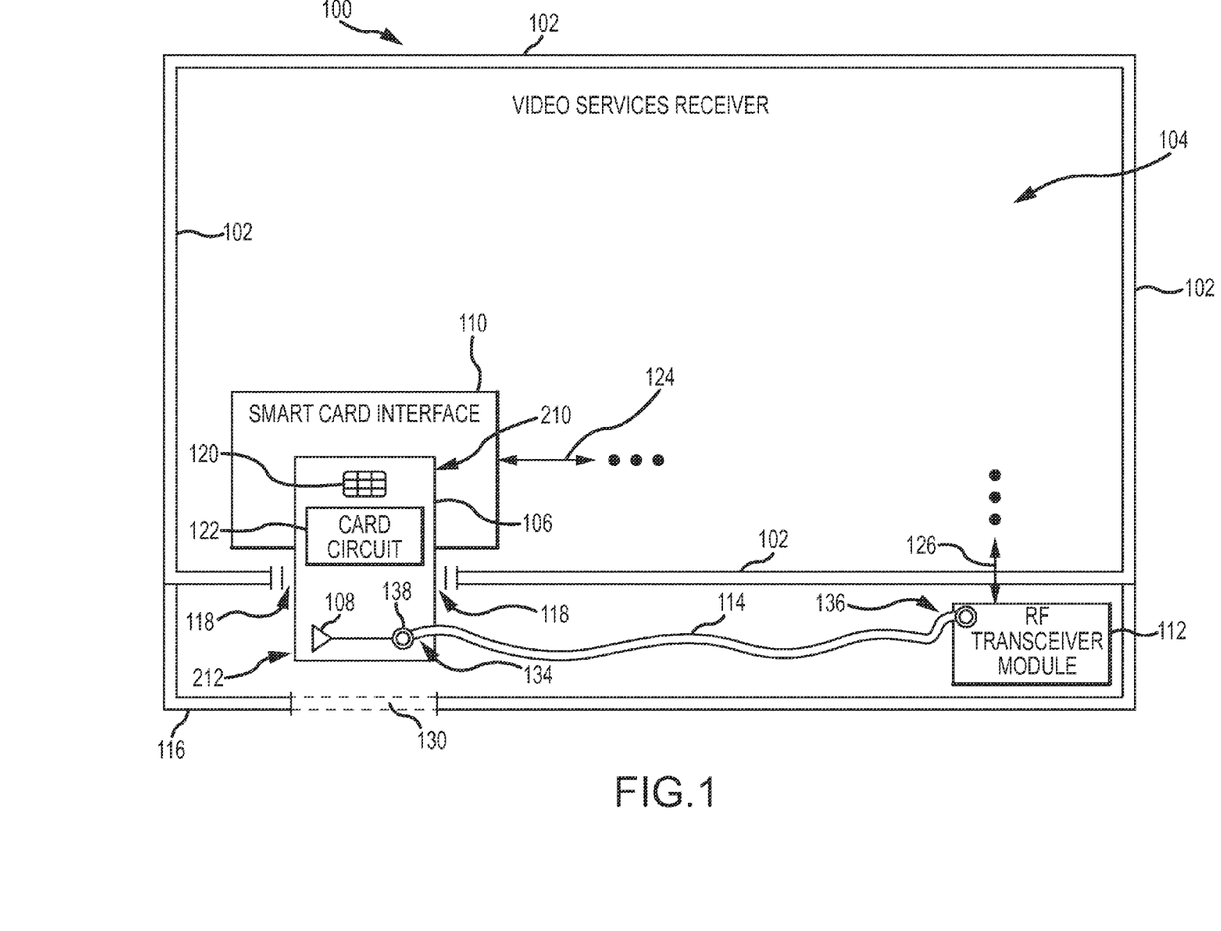
FIG. 1 is a simplified schematic representation of an exemplary embodiment of a video services receiver.

FIG. 1 is a simplified schematic representation of an exemplary embodiment of a video services receiver 100. FIG. 1 generally represents a top-down phantom or exposed view of the video services receiver 100. The illustrated embodiment of the video services receiver 100 includes, without limitation: a chassis 102; an interior space 104 at least partially defined by the chassis 102; a smart card 106 having an RF antenna arrangement 108 formed or mounted thereon; a smart card interface 110; an RF transceiver module 112; an RF transmission line 114 coupled between the RF antenna arrangement 108 and the RF transceiver module 112; and a housing bezel 116 coupled to the chassis 102. It should be understood that the video services receiver 100 will include additional components, features, devices, hardware, software, and processing logic that cooperate to provide the desired video services functionality. Thus, although not shown in FIG. 1, the video services receiver 100 may also include, without limitation: one or more printed circuit boards, power supply or power regulation components, electronic components and devices, memory elements, a hard disk, one or more processor chips, and the like. These and other conventional aspects of the video services receiver 100 will not be described in detail here.

The chassis 102 functions as the primary structural housing of the video services receiver 100. The chassis 102 generally defines an interior space 104 of the video services receiver 100. The interior space 104 accommodates most of the electronic components, devices, hardware, wires, and other elements of the video services receiver 100. Although not always required, the chassis 102 may be fabricated from an electrically conductive material such as steel or aluminum. In alternative embodiments, the chassis 102 may be formed from a dielectric material such as plastic. As explained in more detail below, if the chassis 102 is formed from (or includes any appreciable amount of) electrically conductive material, then it could influence the electromagnetic characteristics of the RF components inside or near the chassis 102, including the RF antenna arrangement 108 and the RF transceiver module 112.

The video services receiver 100 is configured to accept and read smart cards, which may be designed and fabricated for compatibility with one or more smart card conventions, specifications, or standards. In this regard, FIG. 1 depicts the video services receiver 100 with a compatible smart card 106 already inserted into the smart card interface 110. The smart card interface 110 is configured to receive the smart card 106, establish electrical connections with the smart card 106, and physically maintain the smart card 106 in place. In certain embodiments, the smart card interface 110 is located in the interior space 104. Thus, the chassis 102 substantially surrounds and encloses the smart card interface 110. The smart card interface 110 may cooperate with a slot 118 or an opening formed in the chassis 102, where the slot 118 accommodates insertion and extraction of the smart card 106. The smart card interface 110 may leverage conventional smart card protocols and technologies to establish the necessary electrical connections with contacts 120 of the smart card 106.

As is well-understood by those familiar with smart card technology, the smart card 106 includes a card circuit module 122, which may be embedded in the body of the smart card 106, mounted to the surface of the smart card 106, or otherwise carried by the body of the smart card 106. The card circuit module 122 may be programmed as needed to support one or more operational functions of the video services receiver 100. In certain embodiments, the card circuit module 122 may be programmed to support one or more of the following functions, without limitation: security functions; user or device verification or authentication; setting capabilities or permissions of the video services receiver 100; locking or unlocking access to certain features or functions of the video services receiver 100; and access control to video subscription services.

The card circuit module 122 is electrically connected to the contacts 120 to facilitate the reading of data from the smart card 106. When properly inserted, the smart card 106 is physically and electrically coupled to the smart card interface 110. The smart card interface 110 cooperates with the card circuit module 122 as needed to support one or more operational functions of the video services receiver 100. Thus, the smart card interface 110 can read data stored on the smart card 106. The arrow 124 indicates that the smart card interface 110 may communicate data to and/or from the card circuit module 122 as needed.

The RF antenna arrangement 108 and the RF transceiver module 112 cooperate to support wireless data communication functions of the video services receiver 100. The RF transceiver module 112 is configured to receive, transmit, and process data in accordance with one or more wireless communication protocols. In this regard, the RF transceiver module 112 and the RF antenna arrangement 108 may be compatible with one or more of the following wireless data communication protocols, without limitation: IEEE 802.11 (any variant), also known as Wi-Fi; the Bluetooth wireless protocol; and IEEE 802.15, also known as ZigBee. Consequently, the RF antenna arrangement 108 and the RF transceiver module 112 support RF signals having frequencies in the bands that are specified by these wireless communication protocols. In certain embodiments, therefore, the RF transceiver module 112 and the RF antenna arrangement 108 can handle signals in the 2.4 GHz band, the 5.0 GHz band, or dual bands (with the corresponding frequency channels) as specified by the IEEE 802.11, IEEE 802.15, and Bluetooth specifications. In this regard, the RF antenna arrangement 108 is designed, fabricated, and tuned for operation at the desired frequency bands and channels.

The RF transceiver module 112 supports wireless data communication functions of the video services receiver 100, such as short-range peer-to-peer wireless communication, wireless local area network communication, Internet connectivity, or the like. The data received/transmitted by the RF transceiver module 112 can be routed by, processed by, or otherwise handled by one or more other components, processing modules, or devices of the video services receiver 100. Accordingly, the arrow 126 indicates that the RF transceiver module 112 may communicate data to and/or from other components of the video services receiver 100 as needed.

The RF transceiver module 112 is an "off-card" component in that it is physically distinct, physically separate, and remotely located from the smart card 106. This remote positioning is depicted in FIG. 1, where the smart card 106 is located at or near one side of the chassis 102 and the RF transceiver module 112 is located at or near the opposite side of the chassis 102. The RF transmission line 114 has an appropriate length that allows it to span the distance between the RF antenna arrangement 108 and the RF transceiver module 112. In practice, the RF transceiver module 112 may be located within the interior 104 of the chassis 102 or it may be located within a space defined under a trim piece such as the housing bezel 116, which in turn is external to the chassis 102. FIG. 1 depicts an embodiment where the bezel 116 is attached to an end of the chassis 102 (such as the front side). The bezel 116 is preferably formed from a dielectric material such as plastic, such that the performance of the RF antenna arrangement 108 and the RF transceiver module 112 is not compromised. The bezel 116 may include a door 130, a flap, or an opening that is designed to provide access to the smart card 106. The door 130 allows a user to insert and remove the smart card 106 from the smart card interface 110 as needed.

The RF antenna arrangement 108 may be formed or mounted on one or more surfaces of the smart card 106, or it may be integrally fabricated into the smart card 106 itself. The RF antenna arrangement 108 shown in FIG. 1 is positioned on a top surface of the smart card 106, although some or all of the RF antenna arrangement 108 could be positioned on the bottom surface of the smart card 106. The RF transmission line 114 (which may be realized as an RF coaxial cable in some embodiments) has a first end 134 or port that is suitably configured to connect with the RF antenna arrangement 108, and a second end 136 or port that is suitably configured to connect with the RF transceiver module 112. In certain implementations, the RF antenna arrangement 108 includes an RF connector 138 that facilitates a physical and electrical connection between the first end 134 of the RF transmission line 114 and the smart card 106. The first end 134 of the RF transmission line 114 may include a compatible connector that is configured to mate with the RF connector 138, or the first end 134 may be otherwise designed to mate with the RF connector 138 by way of a solder connection, a press-fit coupling, or the like. As one non-limiting example, the RF connector 138 may be a miniature coaxial connector such as a "U.FL" connector. A similar type of connection could be utilized to physically and electrically couple the RF transmission line 114 to the RF transceiver module 112.

It should be appreciated that the smart card 106 is repurposed to some extent to expand its utility beyond the traditional smart card functionality. The smart card functionality remains intact, but that functionality need not be (and in preferred embodiments is not) related to or otherwise associated with the wireless data communication functionality of the RF antenna arrangement 108 that is carried by the smart card 106. Indeed, the RF antenna arrangement 108 is physically and electrically isolated from the card circuit module 122 of the smart card 106, and (in certain embodiments) the RF signals communicated by the RF antenna arrangement 108 are unrelated to the native functionality of the card circuit module 122, and are unrelated to the operational features of the video services receiver 100 that are otherwise dependent on or influenced by the information stored on the smart card 106. In other words, the RF antenna arrangement 108 can be functionally divorced from the card circuit module 122, such that operation of the card circuit module 122 is unaffected by the RF signals communicated by the RF antenna arrangement 108, and vice versa.

Figure 2:
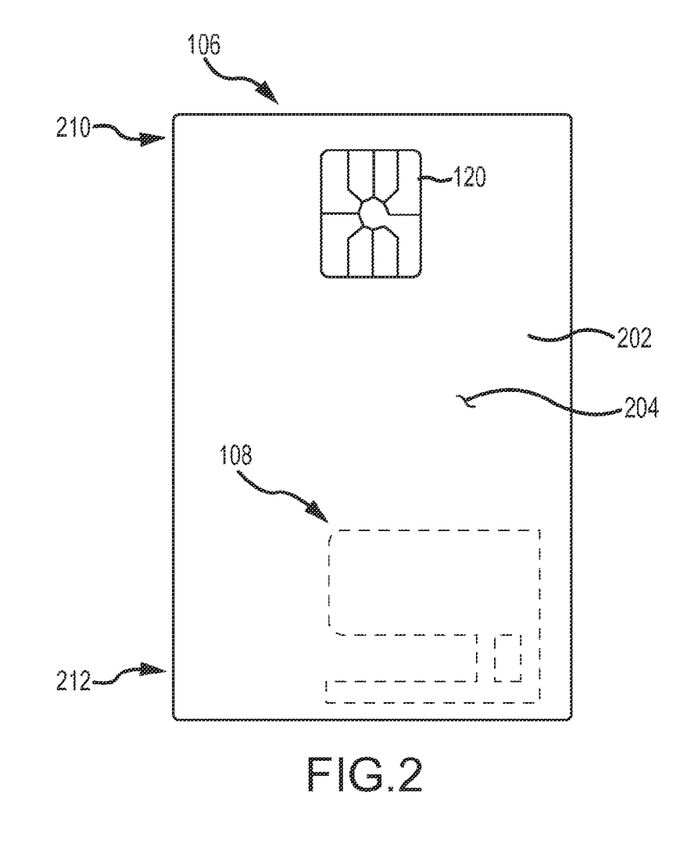
FIG. 2 is a bottom view of a smart card that is suitable for use with the video services receiver shown in FIG. 1.
Figure 3:
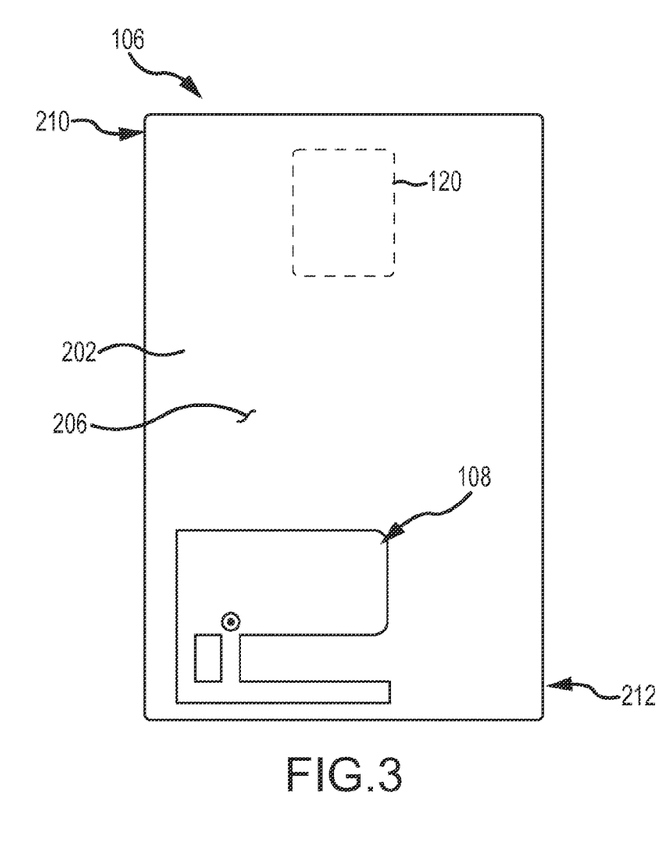
FIG. 3 is a top view of the smart card shown in FIG. 2.

FIGS. 2 and 3 depict one exemplary embodiment of the smart card 106 in more detail. FIG. 2 is a bottom view of the smart card 106, and FIG. 3 is a top view of the smart card 106. The smart card 106 has a card body 202, which represents the overall general structural element of the smart card 106. The card body 202 is preferably formed from a dielectric substrate or insulating material such as, without limitation: plastic, an FR-4 circuit board, a ceramic material, a flexible vinyl material, or the like. The RF antenna arrangement 108 is carried by the dielectric substrate in any practical manner. For example, the RF antenna arrangement 108 may be created from a conductive material on the dielectric substrate, where the conductive material is patterned or etched to form conductive features that reside on a surface of the card body 202 (as depicted in FIG. 3). As another example, the RF antenna arrangement 108 could be implemented as a surface-mount component such as a chip antenna that is affixed to (e.g., soldered onto) a metal trace located on a surface of the card body 202, or that is otherwise mounted to the dielectric substrate. As yet another example, the RF antenna arrangement 108 could be embedded into the material that forms the card body 202. In this regard, the RF antenna arrangement 108 could be fabricated concurrently with the contacts 120 and/or with the card circuit module 122 of the smart card 106 if so desired.

For this particular embodiment, the contacts 120 are exposed on the bottom surface 204 of the smart card 106, and the RF antenna arrangement 108 resides on the top surface 206 of the smart card 106. In alternative embodiments, however, the contacts 120 and the RF antenna arrangement 108 could be located on the same side of the smart card 106. In yet other embodiments, the RF antenna arrangement 108 may have some elements positioned on the top surface 206 and other elements positioned on the bottom surface 204, as appropriate for the particular application.

The smart card 106 has a circuit end 210 and an antenna end 212 that is opposite the circuit end 210. Although not always required, the circuit end 210 and the antenna end 212 generally define the major longitudinal dimension of the smart card 106, which is rectangular in shape. The RF antenna arrangement 108 is located at or near the antenna end of the card body 202, and the contacts 120 are located at or near the circuit end of the card body 202. As schematically depicted in FIG. 1, the smart card interface 110 receives and cooperates with the circuit end 210 of the card body 202 when the smart card 106 is inserted into the smart card interface 110. This arrangement is also shown in FIG. 4, which is a perspective view of a portion of a video services receiver that implements an embodiment of an on-card antenna structure as described here.

Notably, the antenna end 212 of the card body 202 extends from the chassis 102 when the smart card 106 is inserted into the smart card interface 110. Consequently, at least some of the RF antenna arrangement 108 protrudes from the chassis 102 when the smart card 106 is inserted into the smart card interface 110. In preferred embodiments, the entire RF antenna arrangement 108 remains outside of the chassis 102 when the smart card 106 is properly installed, as shown in FIG. 1 and FIG. 4. This feature is desirable to reduce the amount of unwanted electromagnetic interference that may otherwise be caused by the chassis 102 and/or by electrically conductive components in the chassis 102.

Figure 4:
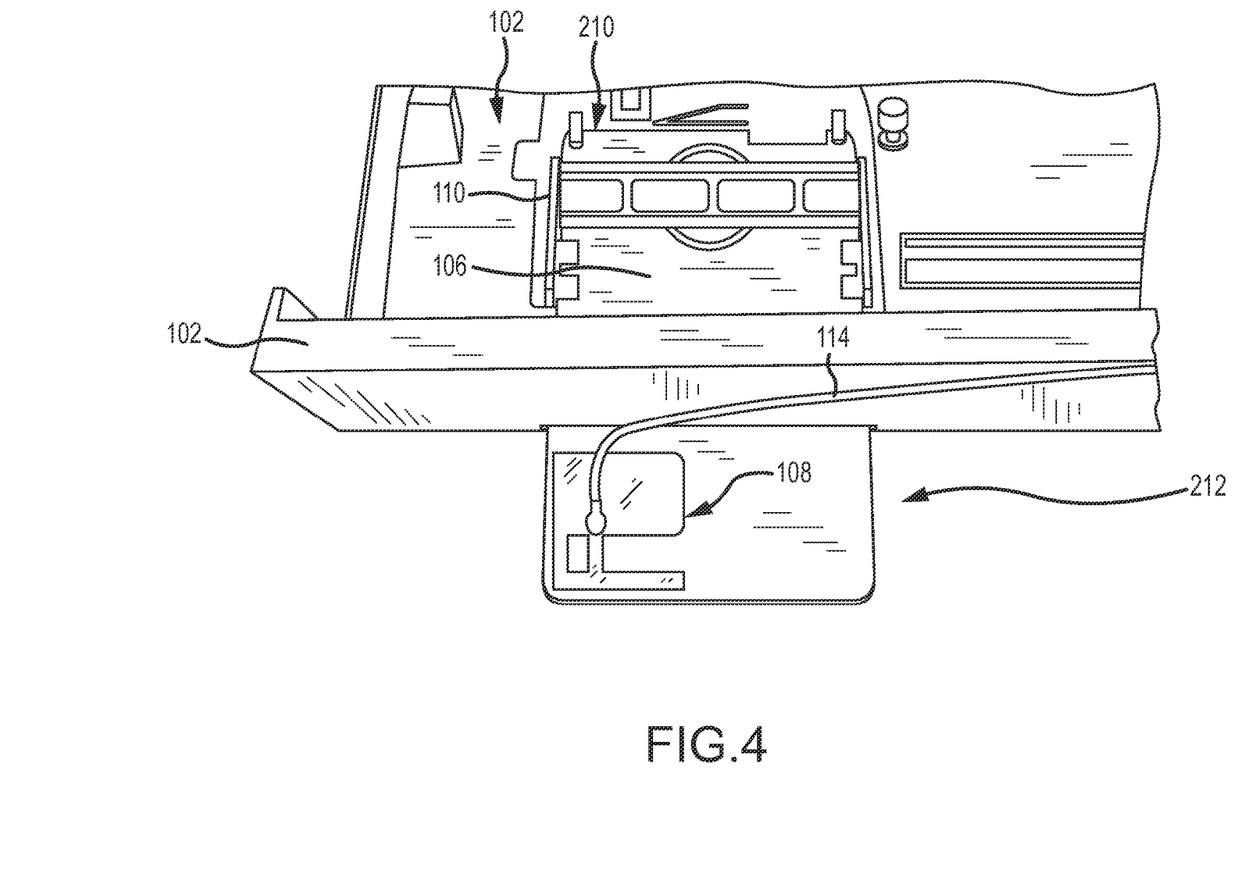
FIG. 4 is a perspective view of a portion of a video services receiver.

The embodiment of the RF antenna arrangement 108 shown in FIGS. 2-4 utilizes an electrically conductive material, which may be formed, printed, or etched onto the surface of the card body 202. The material used for the card body 202 serves as a dielectric substrate for the RF antenna arrangement 108. The conductive portion of the RF antenna arrangement 108 is formed from an electrically conductive material such as, without limitation, copper, aluminum, gold, alloys thereof, or the like. In practice, the conductive element of the RF antenna arrangement 108 can be formed from a relatively thin sheet or printed film of metal, such as copper. Although not always required, the illustrated embodiment of the RF antenna arrangement 108 corresponds to an "inverted F" design, wherein the particular length, shape, and size of the "inverted F" portion are configured to resonate at the desired frequency or frequency band with the desired polarization. As is well-understood by those familiar with RF antenna design, the RF antenna arrangement 108 is tuned primarily by adjusting or selecting its length, i.e., the length of its major longitudinal path. A longer path results in a lower resonant frequency, and a shorter path results in a higher resonant frequency. In this "inverted F" antenna example, the frequency of operation is in the 2.4 GHz band. Similarly, a dipole antenna can also be implemented onto the smart card for dual band operation in both 2.4 GHz and 5.0 GHz bands.

It should be appreciated that alternative antenna configurations could be utilized to support an off-card RF transceiver module if so desired. For example, the smart card 106 could serve as a substrate for a plurality of different RF antennas to provide spatial or polarization diversity, and/or to support multiple RF transceiver modules. As another example, the particular type or antenna design may vary as appropriate for the application or use case. In this regard, the RF antenna arrangement 108 may exhibit characteristics resembling a monopole antenna, a dipole antenna, a balanced antenna, an unbalanced antenna, a waveguide antenna, a stripline antenna, a microstrip antenna, a transmission line antenna, or the like. Furthermore, although an "inverted F" layout is shown in the figures, the RF antenna arrangement 108 may have an alternative configuration, including, without limitation: an "inverted L" layout; an "inverted H" layout; a coil; a meandering line; a chip antenna; or the like.

Figure 5:
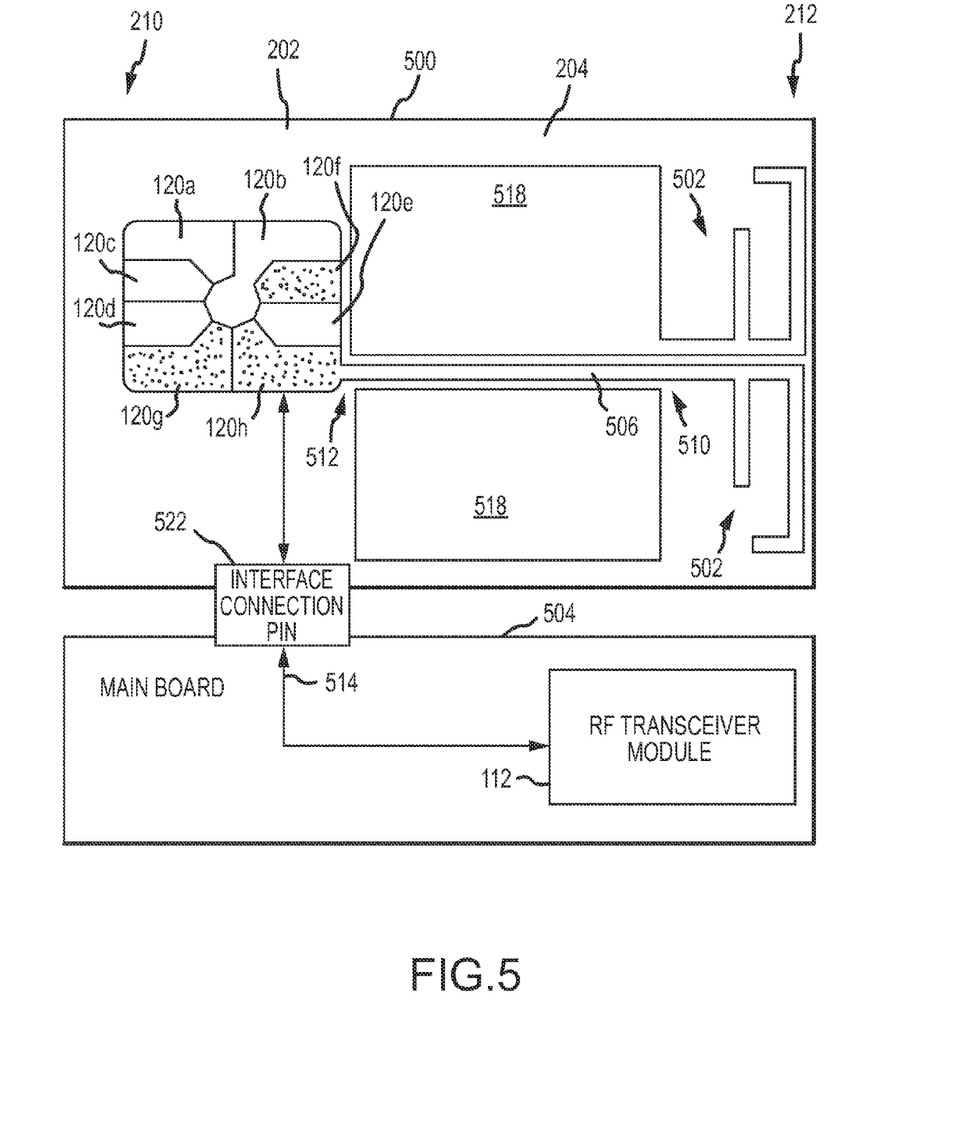
FIG. 5 is a schematic representation of another embodiment of a smart card that carries an RF antenna arrangement.

FIG. 5 is a schematic representation of another embodiment of a smart card 500 that carries an RF antenna arrangement 502. FIG. 5 also depicts a section of a main board 504 of the video services receiver (not shown) with which the smart card 500 cooperates. A number of features, functions, and characteristics of the smart card 500 and the RF antenna arrangement 502 are similar or identical to those described above with reference to FIGS. 1-4. For the sake of brevity and clarity, such common subject matter will not be redundantly described here in the context of FIG. 5.

In contrast to the previously-described embodiments, the smart card 500 leverages one or more of its otherwise unused contacts as an electrical interface that supports the operation of the RF antenna arrangement 502. In such an implementation, the smart card 500 includes an RF transmission line 506 that runs between the RF antenna arrangement 502 and at least one contact that is not already assigned to support the functionality of the card circuit module 122 (see FIG. 1) that resides on the smart card 500. Thus, when the smart card 500 is properly installed into the smart card interface 110 of the host video services receiver, the smart card interface 110 establishes electrical connectivity with the RF antenna arrangement 502, which is electrically connected to the unused contact(s) by way of the RF transmission line 506.

Referring to FIG. 5, the illustrated embodiment of the smart card 500 includes eight contacts 120, most of which are used to support the native and traditional functions of the smart card 500. In other words, most of the contacts 120 are utilized by the card circuit module 122 (not shown in FIG. 5) in accordance with well-known smart card technologies. For this particular example, the contacts 120 are assigned as follows: a first contact 120a is assigned to high voltage potential, such as five volts; a second contact 120b is assigned to ground potential; a third contact 120c is assigned to a Reset signal; a fourth contact 120d is assigned to a Clock signal; and a fifth contact 120e is assigned to an Input/Output signal. These five contacts 120a-120e support the functionality of the card circuit module 122. Notably, the illustrated embodiment of the smart card 500 includes three contacts 120f-120h that are unused, unassigned, and otherwise not connected to the card circuit module 122 that is carried by the smart card 500.

The RF antenna arrangement 502 is configured as a dual-band antenna having two "inverted-F" radiating sections. The RF transmission line 506 has a first end 510 that is physically and electrically connected to the RF antenna arrangement 502, and has a second end 512 that is electrically coupled to the RF transceiver module 112 of the video services receiver. For this particular embodiment, the second end 512 is coupled to the RF transceiver module 112 via the contact 120h, the smart card interface 110 (see FIG. 1), and another RF transmission line 514 that is electrically coupled between the smart card interface 110 and the RF transceiver module 112.

In practice, the RF transmission line 506 can be fabricated as a conductive material that is patterned on the dielectric substrate of the smart card 500. In this regard, the RF transmission line 506 could be fabricated concurrently with the RF antenna arrangement 502 on the bottom surface 204 of the smart card 500. The embodiment depicted in FIG. 5 also includes ground plane elements 518 that cooperate to support the functionality of the RF antenna arrangement 502 and the RF transmission line 506. With this type of layout, the RF signals received by the RF antenna arrangement 502 are propagated by the RF transmission line 506 to the contact 120h, which is electrically coupled to the off-card RF transceiver module 112 via the conductive features of the smart card interface 110 and the RF transmission line 514. Similarly, RF signals transmitted by the RF antenna arrangement 502 originate from the RF transceiver module 112, and are fed to the radiating elements of the RF antenna arrangement 502 via the RF transmission line 514, the smart card interface 110, the contact 120h, and the RF transmission line 506.

The RF transmission line 514 may be realized as a miniature coaxial cable, which is coupled to the intermediate connection of the smart card interface connection pin 522 for the contact 120h using a suitable RF connector, such as a U.FL connector. The other end of the RF transmission line 514 can be coupled to the RF transceiver module 112 in any appropriate manner, as described previously. The RF transmission line 514 may also be realized as a conductive material that is patterned, or fabricated, on the dielectric substrate of the main board 504 to make a physically and electrically coupled connection to the intermediate connection of the smart card interface connection pin 522 to contact 120h, as described above with reference to the embodiment shown in FIG. 5.

In alternative embodiments, the RF transmission line 506 could be realized as a miniature coaxial cable that is connected between the RF antenna arrangement 502 and the contact 120h. In practice, however, such an implementation may be challenging to fabricate due to physical size constraints, packaging requirements, and clearance and interference considerations related to the configuration of the smart card interface 110, the smart card slot, and the like. For these reasons, preferred embodiments employ conductive traces and features that reside on the surface of the smart card 500 (as depicted in FIG. 5).

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An apparatus comprising:
a smart card interface configured to receive smart cards;
a radio frequency (RF) transceiver module;
a smart card compatible with the smart card interface, the smart card comprising:
a dielectric substrate forming a card body; and
an RF antenna arrangement carried by the dielectric substrate; and
an RF transmission line having a first end configured to connect with the RF antenna arrangement, and having a second end configured to connect with the RF transceiver module.

2. The apparatus of claim 1, wherein:
the RF antenna arrangement further comprises an RF connector; and
the first end of the RF transmission line is configured to mate with the RF connector.

3. The apparatus of claim 1, further comprising a card circuit module associated with the smart card interface, wherein the RF antenna arrangement is physically and electrically isolated from the card circuit module, and wherein RF signals communicated by the RF antenna arrangement are unrelated to native functionality of the card circuit module.

4. The apparatus of claim 1, wherein the RF transmission line comprises a coaxial cable.

5. The apparatus of claim 1, wherein the RF antenna arrangement comprises a conductive material patterned on the dielectric substrate.

6. The apparatus of claim 1, wherein the RF antenna arrangement comprises a surface-mount device mounted to the dielectric substrate.

7. The apparatus of claim 1, further comprising an electrically conductive chassis surrounding the smart card interface, wherein:
the card body has a circuit end and an antenna end opposite the circuit end;
the RF antenna arrangement is located at the antenna end of the card body;
the smart card interface receives the circuit end of the card body when the smart card is inserted into the smart card interface; and
the antenna end of the card body extends from the electrically conductive chassis when the smart card is inserted into the smart card interface.

8. The apparatus of claim 1, wherein:
the smart card is programmed to support operational functions of a video services receiver; and
the RF antenna arrangement and the RF transceiver module cooperate to support wireless data communication functions of the video services receiver.

9. An apparatus comprising:
a smart card interface configured to read data stored on smart cards;
a radio frequency (RF) transceiver module;
a smart card physically and electrically coupled to the smart card interface, the smart card comprising:
a dielectric substrate forming a card body;
a card circuit module carried by the dielectric substrate, wherein the smart card interface reads data stored in the card circuit module; and
an RF antenna arrangement carried by the dielectric substrate, wherein the RF antenna arrangement is functionally divorced from the card circuit module, and wherein operation of the card circuit module is unaffected by RF signals communicated by the RF antenna arrangement; and
an RF transmission line having a first end physically and electrically connected to the RF antenna arrangement, and having a second end electrically coupled to the RF transceiver module.

10. The apparatus of claim 9, wherein the RF antenna arrangement comprises a conductive material patterned on the dielectric substrate.

11. The apparatus of claim 9, wherein the RF antenna arrangement comprises a chip antenna device mounted to the dielectric substrate.

12. The apparatus of claim 9, further comprising an electrically conductive chassis surrounding the smart card interface, wherein:
the card body has a circuit end and an antenna end opposite the circuit end;
the RF antenna arrangement is located at the antenna end of the card body;
the circuit end of the card body is received by the smart card interface; and
the antenna end of the card body extends from the electrically conductive chassis when the smart card is inserted into the smart card interface.

13. The apparatus of claim 9, wherein:
the smart card is programmed to support operational functions of a video services receiver; and
the RF antenna arrangement and the RF transceiver module cooperate to support wireless data communication functions of the video services receiver.

14. The apparatus of claim 9, wherein:
the second end of the RF transmission line is physically and electrically connected to a contact of the card circuit module; and
the contact is electrically coupled to the RF transceiver module.

15. The apparatus of claim 14, wherein the RF transmission line comprises a conductive material patterned on the dielectric substrate.

16. A smart card apparatus comprising:
a dielectric substrate forming a card body;
a card circuit module carried by the dielectric substrate;
a radio frequency (RF) antenna arrangement carried by the dielectric substrate, wherein the RF antenna arrangement is physically and electrically isolated from the card circuit module, and wherein RF signals communicated by the RF antenna arrangement are unrelated to native functionality of the card circuit module; and
an RF transmission line having a first end physically and electrically coupled to the RF antenna arrangement and having a second end to electrically couple to an off-card transceiver module that is remotely located relative to the smart card apparatus.

17. The smart card apparatus of claim 16, wherein the second end of the RF transmission line is electrically coupled to a contact of the card circuit module.

18. The smart card apparatus of claim 17, wherein the RF transmission line comprises a conductive material patterned on the dielectric substrate.

19. The smart card apparatus of claim 16, wherein the RF antenna arrangement comprises a surface-mount device mounted to the dielectric substrate.

20. The apparatus of claim 16, wherein the RF antenna arrangement is tuned to frequencies in a 2.4 GHz band.

21. The apparatus of claim 16, wherein the RF antenna arrangement is tuned to frequencies in a 5.0 GHz band.

22. The apparatus of claim 16, wherein the RF antenna arrangement is tuned to frequencies in both a 2.4 GHz band and a 5.0 GHz band.

* * * * *